(12) United States Patent
Hsu et al.

(10) Patent No.: US 7,885,087 B2
(45) Date of Patent: Feb. 8, 2011

(54) MODULARIZED ACTIVE POWER FILTER

(75) Inventors: Wen Hsu, Kaohsiung (TW); Yu-Ting Kuo, Kaohsiung (TW); Ming-Hong Chiueh, Kaohsiung (TW); Wen-Pin Hsu, Kaohsiung (TW); Min-Sheng Huang, Kaohsiung (TW)

(73) Assignee: Ablerex Electronics Co., Ltd., Hsintien (TW)

( * ) Notice: Subject to any disclaimer, the term of this patent is extended or adjusted under 35 U.S.C. 154(b) by 686 days.

(21) Appl. No.: 11/856,800

(22) Filed: Sep. 18, 2007

(65) Prior Publication Data

US 2009/0021964 A1    Jan. 22, 2009

(30) Foreign Application Priority Data

Jul. 18, 2007    (TW) .............................. 96126147 A

(51) Int. Cl.
*H02M 1/12* (2006.01)
(52) U.S. Cl. ...................................................... 363/41
(58) Field of Classification Search ................... 363/39, 363/40, 41; 323/208, 209, 210, 211; 307/102, 307/103, 105
See application file for complete search history.

(56) References Cited

U.S. PATENT DOCUMENTS

| | | | |
|---|---|---|---|
| 5,047,909 A * | 9/1991 | Hosoda | ........................ 363/40 |
| 5,614,770 A | 3/1997 | Suelzle | |
| 5,659,464 A * | 8/1997 | Esser | ........................... 363/41 |
| 5,677,832 A | 10/1997 | Tissier et al. | |
| 5,977,660 A | 11/1999 | Mandalakas et al. | |
| 6,861,897 B1 | 3/2005 | Cheng et al. | |
| 2005/0253564 A1* | 11/2005 | Choi | ........................... 323/207 |

* cited by examiner

*Primary Examiner*—Adolf Berhane
(74) *Attorney, Agent, or Firm*—Alan Kamrath; Kamrath & Associates PA

(57) ABSTRACT

A modularized active power filter includes a control module and at least one power module. The control module automatically identifies the number of parallel connected power modules and generates one set of PWM signals to correspondingly control the parallel connected power modules, so as to provide a final compensation current by a single power module or by plural power modules. Thereby, the compensation demand of a load is met. Consequently, the modularized active power filter is able to improve flexibility of compensation capacity, to shorten the time for service, to be suitable for mass production, and to lower the manufacturing cost.

8 Claims, 5 Drawing Sheets

MODULARIZED ACTIVE POWER FILTER

BACKGROUND OF THE INVENTION

1. Field of the Invention

The present invention relates to a modularized active power filter and, specifically, to a modularized active power filter including a control module and at least one power module. The control module automatically detects the number of power modules and generates one set of control signals corresponding to the number of power modules thereof, so as to provide a final compensation capacity generated by the modularized active power filter to compensate for harmonic currents and reactive power of a load.

2. Description of the Related Art

Recently, the characteristics of power electronic devices have improved significantly. The power electronic devices with characteristics of high-voltage rating, high-current rating, and high switching speed have been developed due to the improvement of semiconductor manufacturing technique. Power electronic devices are widely applied in electric power equipment, such as an uninterruptible power supply, motor driver, arc furnace, trolley car, battery charger, lighting appliance, etc. The electric power equipment may generate a large amount of harmonic currents due to the nonlinear input characteristic of such loads. The harmonic currents will pollute the distribution power system resulting in serious problems such as transformer overheat, rotary machine vibration, degrading voltage quality, electric power components destruction, medical facilities malfunction, etc. In order to improve the problems of harmonic pollution effectively, many harmonic control standards, such as IEEE519-1992, IEC1000-3-5, IEC1000-3-4, etc., have been established by international research centers.

Recently, active power filters are developed for suppressing harmonic currents and compensating for the reactive power. Referring initially to FIG. 1, a schematic circuitry of a conventional active power filter is illustrated. A power source 7 provides a load 6 with an electrical power through a power line 10, and an active power filter 8 connects in parallel with the load 6 for providing a compensating current. Moreover, the compensating current equals a summation of the fundamental reactive current and the harmonic currents of the load 6. Subsequently, the compensating current injects into the power line 10 between the power source 7 and the load 6 to suppress the harmonic currents of the load 6 and improve the power factor simultaneously. Both conventional active power filters disclosed in U.S. Pat. Nos. 5,677,832 and 5,614,770 can be categorized as the same kind of described active power filter 8. However, the active power filter 8 consists of a control circuit and a power circuit in one single set, which causes the manufacturer much inconvenience in assembly, test, mass production, and service of the active power filter 8. On the other hand, users of the conventional active power filters have to replace the active power filter 8 with another one which has a larger compensation capacity while the compensation demand of the load 6 increases. This will cause a waste in finance. Although some of the conventional active power filters have a function of parallel-operation, a plurality of active power filters can be connected in parallel to increase the compensation capacity when the compensation demand of the load 6 increases. However, the manufacturing cost cannot be decreased substantially since each active power filter still requires a control circuit and a power circuit.

For increasing flexibility in an active power filter application, an active power filter 9 with prior modularized structure was developed, which is shown in FIG. 2. The active power filter 9 comprises a control module 91 and a power module 92. The control module 91 has a primary control circuit 911 and a current sensing circuit 912. The power module 92 has a power inverter 921, a voltage/current sensing circuit 922, an auxiliary control circuit 923, a pulse width modulation (PWM) circuit 924, and a driving circuit 925. The power inverter 921 provides an AC output terminal 9211 and a DC output terminal 9212. The AC output terminal 9211 connects to the power line 10. When the conventional modularized active power filter 9 is used to filter out the harmonic currents and compensate for the reactive power of the load 6, the current sensing circuit 912 of the control module 91 detects the current of the load 6 and transmits a signal to the primary control circuit 911. Thereby, the primary control circuit 911 generates a current control signal for the auxiliary control circuit 923 of the power module 92. Meanwhile, the voltage/current sensing circuit 922 of the power module 92 detects a compensating current of the inverter 921 and a voltage of the DC output terminal 9212 and, then, sends a compensating current signal and a voltage signal to the auxiliary control circuit 923.

According to the current control signal generated by the primary control circuit 911 and the voltage signal as well as the compensating current signal detected by the voltage/current sensing current 922, the auxiliary control circuit 923 generates a modulation signal and sends it to the PWM circuit 924 for generating a PWM signal. The PWM signals generated by the PWM circuit 924 are sent to the driving circuit 925, so as to generate a plurality of drive signals for controlling a plurality of power electronic switches of the inverter 921 to generate a compensating current. The compensating current equals a summation of the fundamental reactive current and the harmonic currents of the load 6 and is injected into the power line 10 for suppressing the harmonic currents of the load 6 and improving the power factor.

Still referring to FIG. 2, the compensation capacity of the conventional modularized active power filter 9 can be enlarged flexibly by increasing the number of power modules 92 while the compensation demand of the load 6 increases. In comparison with the conventional active power filter 8 shown in FIG. 1, the conventional modularized active power filter 9 provides a better flexibility of compensation capacity. Nevertheless, for completing the close loop control to generate the PWM signal and then control the inverter 921 through the driving circuit 925, the auxiliary control circuit 923 is still necessary in the power module 92 to receive the current control signal from the primary control circuit 911 of the control module 91, the compensating current signal and the voltage signal from the voltage/current sensing circuit 922 of the power module 92. Accordingly, the use of the auxiliary control circuit 923 complicates the circuit of the power module 92 and increases the manufacturing cost thereof. Also, no signal is transmitted from the at least one power module 92 for notifying the control module 91 of the information about the compensation capacity of the power module 92 or the number of power modules 92 when more than one power module 92 is used. As a result, it still causes much inconvenience to a manufacturer in assembly, test, manufacture, and service due to a requirement for manually setting the above information when the power module 92 is first coupled with the control module 91.

The present invention provides a modularized active power filter including a control module and at least one power module. The control module comprises a module counting circuit while the power module comprises a module state sensing circuit. The module counting circuit receives a signal from the module state sensing circuit, such that the control module is able to identify the number of applied power modules automatically. Thereby, the control module generates one set of control signals to at least one power module corresponding to the number thereof, such that a final compensation capacity is provided by a single power module or jointly provided by plural power modules. Through the provided final compensation capacity, the harmonic currents of a load are filtered Out, and the reactive power is compensated. Furthermore, in comparison with the conventional modularized active power filter 9, the auxiliary control circuit 923 and the PWM circuit 924 thereof can be omitted since a PWM signal is transmitted from the control module to the parallel connected power modules directly in the present invention. Therefore, when the power module is damaged or the compensation capacity is changed, it is easy to process a replacement or change for the power module. Consequently, the flexibility of compensation capacity is improved, and the time for service is shortened. Moreover, the modularization of the active power filter is suitable for mass production, and the manufacturing cost is lowered.

SUMMARY OF THE INVENTION

The primary objective of this invention is to provide a modularized active power filter for automatically identifying the number of power modules by a control module that further generates one set of PWM signals to control the parallel connected power modules simultaneously. Thereby, a final compensation capacity is provided by a single power module or jointly provided by plural power modules for filtering out the harmonic currents and compensating for the reactive power of a load. Consequently, for the presented modularized active power filter, the flexibility of compensation capacity is advanced, and the time for service is shortened. Moreover, the presented modularized active power filter is suitable for mass production, and the manufacturing cost is lowered.

Further scope of the applicability of the present invention will become apparent from the detailed description given hereinafter. However, it should be understood that the detailed description and specific examples, while indicating preferred embodiments of the invention, are given by way of illustration only, since various modifications will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
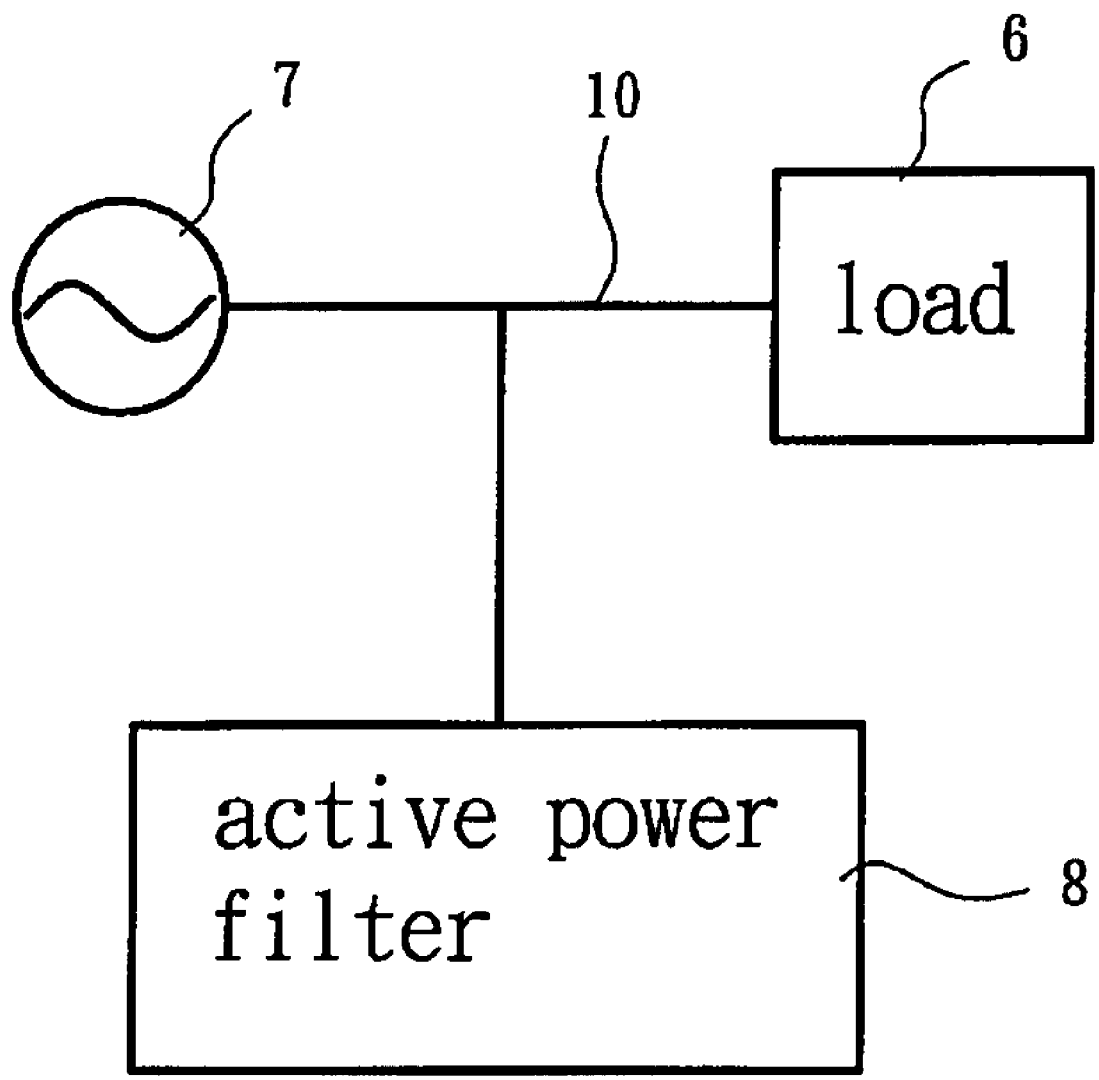
FIG. 1 is a schematic circuitry of a conventional active power filter in accordance with the prior art.
Figure 2:
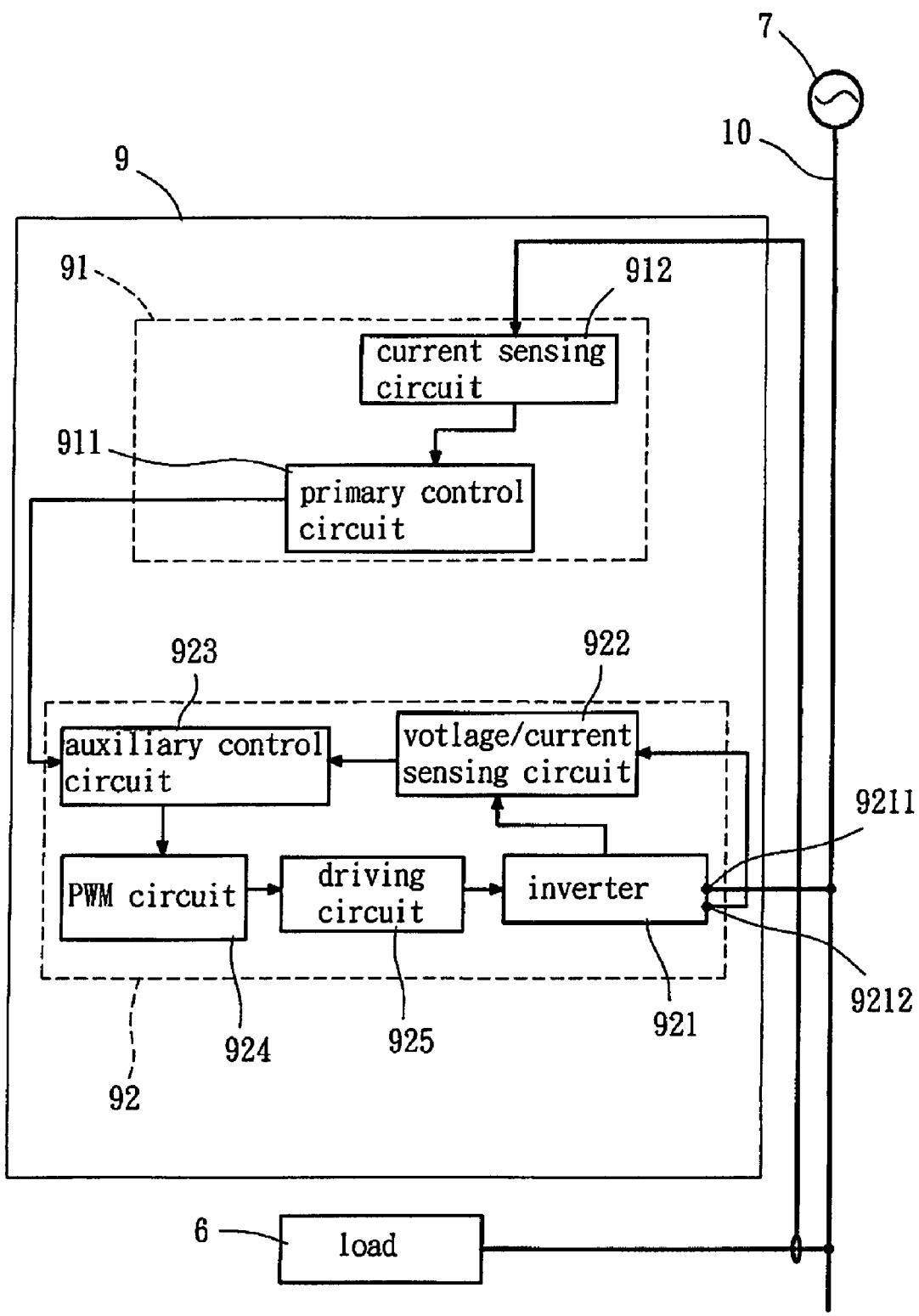
FIG. 2 is a schematic circuitry of a conventional modularized active power filter in accordance with the prior art.
Figure 3:
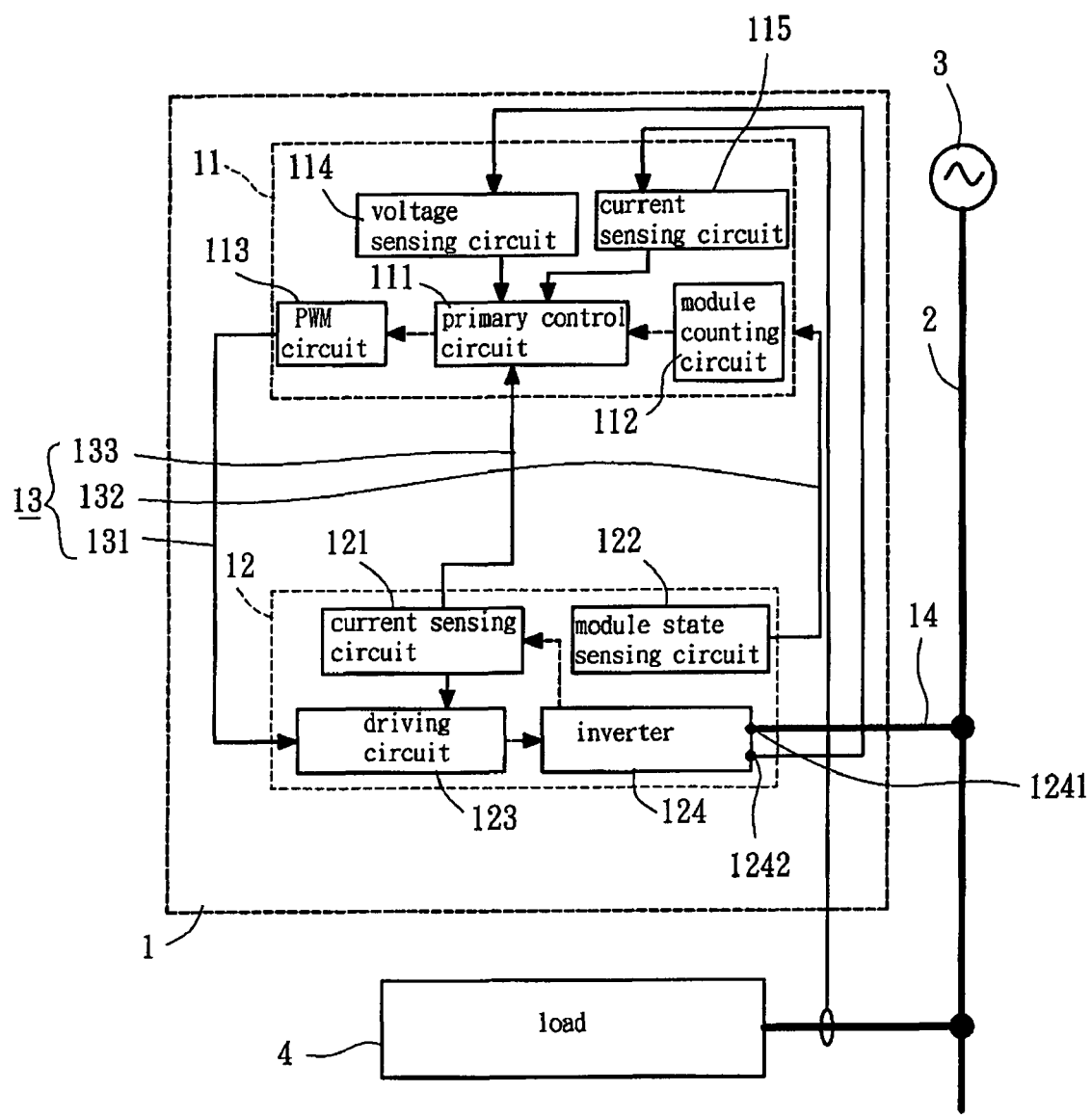
FIG. 3 is a schematic circuitry of a modularized active power filter in accordance with a first embodiment of the present invention.

Referring to FIG. 3, a schematic circuitry of a power system with a modularized active power filter in accordance with a first embodiment of the present invention is illustrated. A modularized active power filter 1 electrically connects to a power line 2 between a power source 3 and a load 4 in parallel, with the power source 3 supplying the load 4 with electrical power through the power line 2. The modularized active power filter 1 is employed to provide a compensating current which equals a summation of the fundamental reactive current and the harmonic currents of the load 4. Subsequently, through injecting the compensating current into the power line 2, the harmonic currents of the load 4 is suppressed, and the power factor is improved simultaneously.

Still referring to FIG. 3, the modularized active power filter 1 comprises a control module 11, a first power module 12, a control signal bus 13, and an AC output line 14. The control module 11 and the first power module 12 electrically connects with each other through the control signal bus 13 that comprises a PWM signal line 131, a module state signal line 132, and a current signal line 133. The control module 11 is used to identify the number of connected power modules, and that in the presented first embodiment is "one", because there is merely a first power module 12 connected. Thereby, the control module 11 generates a control signal for controlling the first power module 12 to provide a final compensating current, and the final compensating current is outputted from the first power module 12 to the power line 2 by the AC output line 14. Accordingly, the harmonic currents of the load 4 are filtered out, and the reactive power is compensated.

Still referring to FIG. 3, the control module 11 comprises a primary control circuit 111, a module counting circuit 112, a PWM circuit 113, a voltage sensing circuit 114, and a current sensing circuit 115. The first power module 12 comprises a current sensing circuit 121, a module state sensing circuit 122, a driving circuit 123, and an inverter 124. Outputs of the module counting circuit 112, the voltage sensing circuit 114, and the current sensing circuit 115 are sent to the primary control circuit 111, and then, the output of the primary control circuit 111 is sent to the PWM circuit 113. The driving circuit 123 of the first power module 12 receives an output of the PWM circuit 113 through the PWM signal line 131. The current sensing circuit 121 connects to the inverter 124 for detecting the output current of the first power module 12 and sends its output signal to the primary control circuit 111 of the control module 11 by the current signal line 133. Moreover, the output signal of the current sensing circuit 121 is also transmitted to the driving circuit 123 for protecting the first power module 12. The driving circuit 123 couples with the inverter 124 so as to send the drive signals to drive power electronic switches of the inverter 124. Besides, the inverter 124 has an AC output terminal 1241 and a DC output terminal 1242, and the AC output terminal 1241 is connected to the power line 2 via the AC output line 14.

The difference between the presented modularized active power filter 1 and the conventional modularized active power filter 9 is as follows. The module state sensing circuit 122 passes a signal to the module counting circuit 112 using the module state signal line 132 of the control signal bus 13. Hence, the control module 11 is notified of the information of the operation state of the first power module 12. What is more important is that the module counting circuit 112 of the control module 11 can count automatically the number of the connected power modules via the signal generated by the module state sensing circuit 122 without manual setting. Moreover, in comparison with the power module 92 of the conventional modularized active power filter 9, the PWM circuit 113 of the control module 11 can generate and pass the PWM signal to the driving circuit 123 of the first power module 12 through the PWM signal line 131. Consequently, an auxiliary control circuit and a PWM circuit are not necessary to be settled in the first power module 12, and, thereby, the circuitry of the first power module 12 is simplified.

In operation, in the first embodiment of the present invention, the module counting circuit 112 senses that the number of connected power modules is 'one' and, then, outputs a count result signal to the primary control circuit 111. Meanwhile, the current sensing circuit 115 detects a current $i_L$ of the load 4 and sends a detected current signal to the primary control circuit 111. Accordingly, the primary control circuit 111 calculates a single module current signal $i_{L-single}$ for a single power module according to the detected current signal and the count result signal by the following equation (1):

$$\frac{I_L}{1} = i_{L-single} \quad (1)$$

Furthermore, the voltage sensing circuit 114 detects voltage of the DC output terminal 1242 of the inverter 124 and sends a detected voltage signal to the primary control circuit 111. With the single module current signal $i_{L-single}$ and the detected voltage signal, a reference signal of the compensating current is obtained. The current sensing circuit 121 of the first power module 12 detects an output current of the inverter 124, that is, the output current of the first power module 12, and sends its output signal to the primary control circuit 111 by the current signal line 133. With a close loop control, the primary control circuit 111 generates a control signal using the reference signal of the compensating current and the output current of the first power module 12. The control signal is further sent to the PWM circuit 113 for generating the PWM signals, and, then, the PWM signal is passed to the driving circuit 123 of the first power module 12 through the PWM signal line 131 for obtaining the drive signals. Subsequently, the inverter 124 is controlled by the drive signals to generate the compensating current and inject it into the power line 2 through the AC output terminal 1241 and the AC output line 14 for suppressing the harmonic currents and compensating the fundamental reactive current of the load 4. Moreover, the output signal of the current sensing circuit 121 is sent to the driving circuit 123 to provide an over-current protection.

Figure 4:
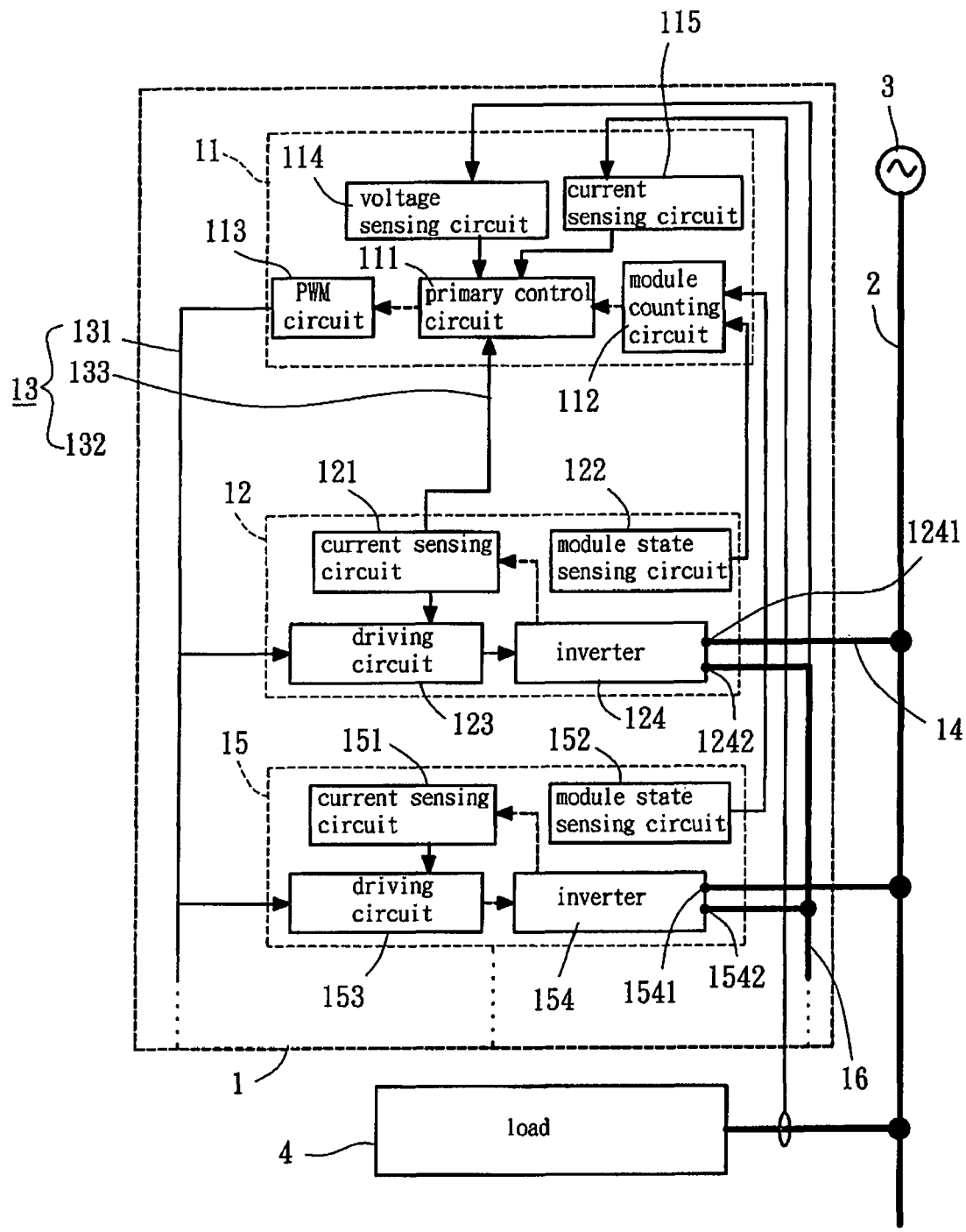
FIG. 4 is a schematic circuitry of a modularized active power filter in accordance with a second embodiment of the present invention.

Turning now to FIG. 4, a schematic circuitry of a modularized active power filter in accordance with a second embodiment of the present invention is illustrated. In comparison with the first embodiment, a second power module 15 is inserted into the modularized active power filter 1 in accordance with the compensation demand of the load 4. With the same circuit of the first power module 12, the second power module 15 also comprises a current sensing circuit 151, a module state sensing circuit 152, a driving circuit 153, and an inverter 154. Besides, the inverter 154 also has an AC output terminal 1541 and a DC output terminal 1542.

With the control module 11, the first power module 12 and the second power module 15 being applied in the modularized active power filter 1 simultaneously, the DC output terminals 1242, 1542 of the inverters 124, 154 connect with each other through a DC bus 16. Meanwhile, two module state signal lines 132 respectively couple the module counting circuit 112 to the module state sensing circuits 122, 152 of the first and second power modules 12, 15.

Still referring to FIG. 4, in operation, in the second embodiment of the present invention, the module counting circuit 112 senses the number of the parallel connected power modules is "two" and, then, sends a count result signal to the primary control circuit 111. Therefore, the single module current signal $i_{L-single}$ is calculated with the following equation (2):

$$\frac{I_L}{2} = i_{L-single} \quad (2)$$

Then, the primary control circuit 111 obtains the reference signal of the compensating current by the single module current signal $i_{L-single}$ and the detected voltage signal generated by the voltage sensing circuit 114 that senses the voltages of the DC output terminals 1242, 1542.

Consequently, through the same process of the control module 11 of the first embodiment, the PWM signals are generated by the PWM circuit 113. Then, the PWM signals are passed to the driving circuits 123, 153 of the first and second power modules 12, 15 through the PWM signal lines 131 to obtain the drive signals of the inverters 124, 154. The inverters 124, 154 are controlled by the drive signals to generate the compensating currents respectively and inject them into the power line 2. In the second embodiment of the present invention, the final compensating current equals the summation of the compensating currents generated by the first and second power modules 12, 15, which suppresses the harmonic currents and compensates the fundamental reactive current of the load 4.

Please notice that although the circuit of power modules 12, 15 is the same, there are two different circuit connection modes for the power modules 12, 15 when the second embodiment of the modularized active power filter 1 is operated. The circuit connection mode of the power module 12 is that the current sensing circuit 121 detects the output current of the inverter 124 and sends its output signal to the primary control circuit 111 through the current signal line 133. Meanwhile, transmitting the output signal of the current sensing circuit 121 to the drive circuit 123 provides an over-current protection. The circuit connection mode of the power module 15 is that the current sensing circuit 151 detects the output current of the inverter 154 and merely sends its output signal to the drive circuit 153 for over-current protection. The difference of these two modes is that the current control signal detected by the current sensing circuit sent to the primary control circuit 111 and the current control signal detected by the current sensing circuit 151 is not required.

As a result, only a power module, that is the first power module 12, provides the primary control circuit 111 with the output signal obtained from the output current of the power module. Moreover, the first and second power modules 12, 15 comprise the module state sensing circuits 122, 152, respectively, to send a signal for notifying the control module 11 of the operation state of the first and second power modules 12, 15.

Still referring to FIG. 4, when the first or second power module 12, 15 fails, the output signal of the module state sensing circuit 122, 152 will transform into a fault signal. Furthermore, the modularized active power filter 1 will then be disconnected from the power line 2. After the faulted power module is removed, repaired and reapplied, or replaced with a new one, the modularized active power filter 1 can be restarted and reconnected to the power line 2. Therefore, the module counting circuit 112 of the control module 11 can automatically sense the number of the parallel connected power modules again, and the control module 11 can control each power module through the primary control circuit 111 and the PWM circuit 113. Consequently, the modularized active power filter 1 is able to replace the power module quickly, such that advantages, like reduced service time and low cost, are achieved.

Furthermore, according to the compensation demand of the load 4, instead of a single second power module 15, a plurality of second power modules 15 can be parallelly connected to the modularized active power filter 1. The circuit of the applied second power module 15 and ways thereof to control and link to other modules is the same as the second power module 15 of the second embodiment. Moreover, a final compensating current is equal to the summation of compensating currents generated by the first power module 12 and the plural second power modules 15 and is able to suppress the harmonic currents and to compensate the fundamental reactive current of the load 4.

Figure 5:
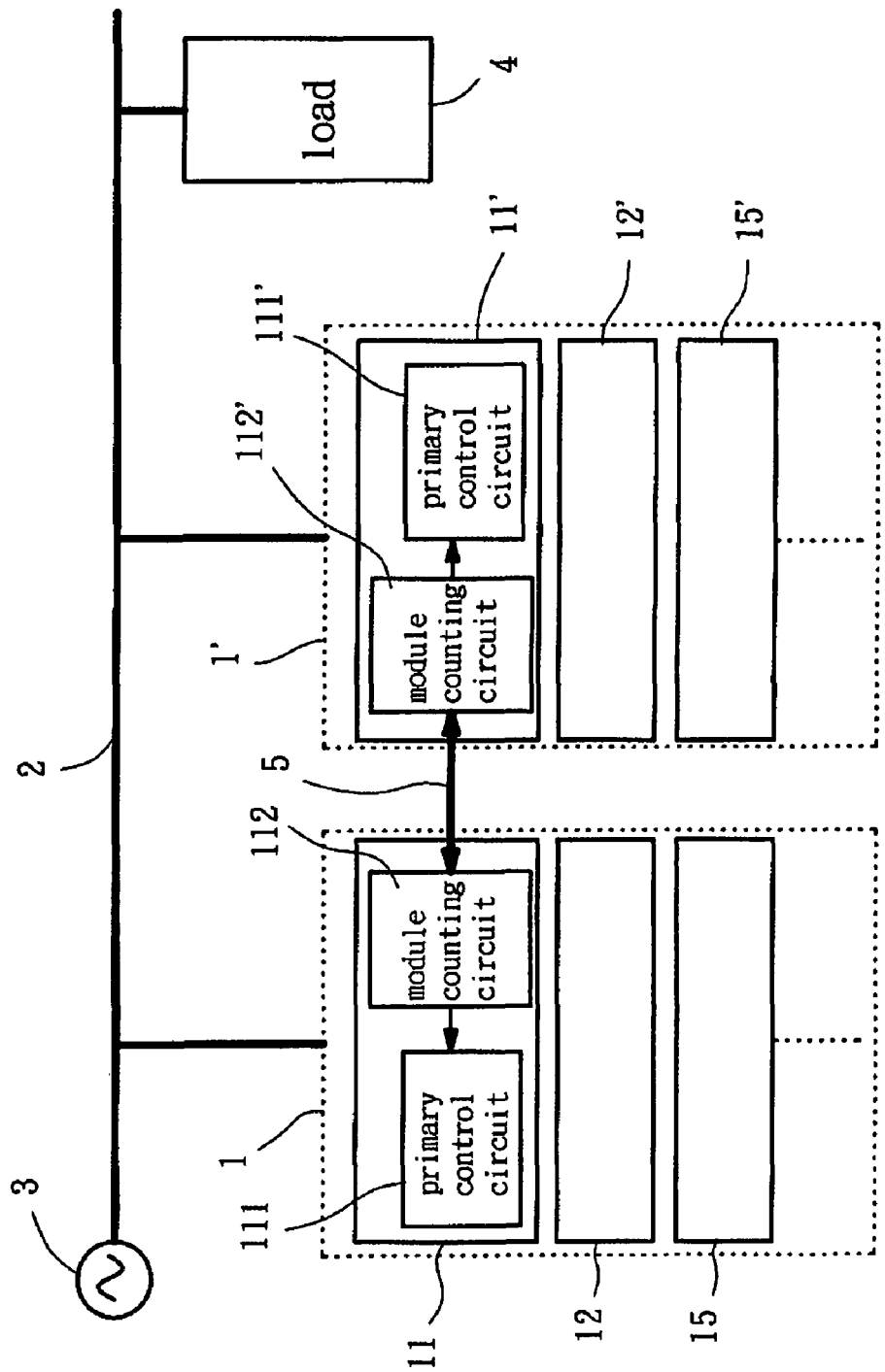
FIG. 5 is a schematic circuitry of a modularized active power filter in accordance with a third embodiment of the present invention.

Turning now to FIG. 5, a schematic circuitry of a modularized active power filter in accordance with a third embodiment of the present invention is illustrated. In comparison with the first and second embodiments, another modularized active power filter 1' is employed in the third embodiment and includes a primary control circuit 11' and a power module 12'. The other modularized active power filter 1' connects to the modularized active power filter 1 in parallel and provides a circuit and an operation which is the same with the modularized active power filter 1. Therefore, both the modularized active power filters 1, 1' couple to the power line 2, parallel connect to the load 4, and have a proposed control module and at least one proposed power module. Furthermore, the module counting circuits 112, 112' of the modularized active power filters 1, 1' connect to each other through a communication line 5.

The number of the second power modules 15, 15' respectively parallelly connected in the modularized active power filters 1, 1' can be the same or different to each other. For example, the module counting circuit 112 of the modularized active power filter 1 obtains the number of the parallel connected power modules in the modularized active power filter 1, which is equal to "m". Meanwhile, the module counting circuit 112' of the modularized active power filter 1' obtains the number of the parallel connected power modules in the modularized active power filter 1', which is equal to "n". After communicating through the communication line 5, the module counting circuits 112, 112' can be notified that the total amount of the power modules in two modularized active power filters 1, 1' is "m+n". Thereby, the primary control circuits 111, 111' calculate respectively the single module current signal $i_{L-single}$ with the following equation (3):

$$\frac{I_L}{m+n} = i_{L-single} \quad (3)$$

Then, the reference signal of the compensating current is obtained.

According to the above, the modularized active power filter 1 of the present invention detects the number of the at least one parallel connected power module and generates one set of corresponding PWM signals to control said power modules.

Therefore, the auxiliary control circuit 923 in the conventional active power filter 9 is not necessary any more, so as to simplify the circuit of the power module. Moreover, the final compensating current used to suppress the harmonic currents and to compensate the fundamental reactive current of the load 4 is obtained from summing the compensating current generated by said at least one power module, such that the process of manual setting is omitted. Consequently, for the presented modularized active power filter, the flexibility of compensation capacity is advanced, and the time for service is shortened. Moreover, the presented modularized active power filter is suitable for mass production, and the manufacturing cost is lowered.

Although the invention has been described in detail with reference to its presently preferred embodiments, it will be understood by one of ordinary skill in the art that various modifications can be made without departing from the spirit and the scope of the invention, as set forth in the appended claims.

What is claimed is:

1. A modularized active power filter comprising:
   a control module;
   a control signal bus; and
   at least one power module electrically connecting with the control module through the control signal bus;
   wherein the control module automatically identifies the number of the at least one power module and generates one set of PWM signals to control at least one applied power module, with the at least one applied power module generating a final compensating current to suppress harmonic currents and compensate for fundamental reactive current of a load;
   wherein the control module comprises a module counting circuit, a primary control circuit, a PWM circuit, a voltage sensing circuit, and a current sensing circuit, with outputs of the module counting circuit, the voltage sensing circuit, and the current sensing circuit coupling to the primary control circuit, with the output of the primary control circuit being sent to the PWM circuit that connects with a PWM signal line for sending the PWM signals to the at least one power module.

2. A modularized active power filter comprising:
   a control module;
   a control signal bus; and
   at least one power module electrically connecting with the control module through the control signal bus;
   wherein the control module automatically identifies the number of the at least one power module and generates one set of PWM signals to control at least one applied power module, with the at least one applied power module generating a final compensating current to suppress harmonic currents and compensate for fundamental reactive current of a load;
   wherein the at least one power module comprises a module state sensing circuit, a current sensing circuit, a driving circuit, and an inverter, with the module state sensing circuit connecting to a module counting circuit of the control module through a module state signal line, with the current sensing circuit connecting to the inverter for detecting output current of the at least one power module and an output signal of the current sensing circuit being sent to the driving circuit, with the driving circuit obtaining the PWM signals through a PWM signal line and an output of the driving circuit coupling with the inverter for driving power electronic devices of the inverter and, then, to generate a compensating current.

3. The modularized active power filter as defined in claim 2, wherein the inverter of the power module further comprises an AC output terminal connecting with a power line via an AC output line.

4. The modularized active power filter as defined in claim 2, wherein the current sensing circuit in one of the at least one power module sends an output signal to a primary control circuit of the control module through a current signal line of a control signal bus whether a number of the at least one power module is one or more than one.

5. The modularized active power filter as defined in claim 2, wherein the inverter of the power module further comprises a DC output terminal connecting with another DC output terminal provided by an inverter of another power module when the number of the at least one power module is more than one.

6. A modularized active power filter comprising:
   a control module;
   a control signal bus; and
   at least one power module electrically connecting with the control module through the control signal bus;
   wherein the control module automatically identifies the number of the at least one power module and generates one set of PWM signals to control at least one applied power module, with the at least one applied power module generating a final compensating current to suppress harmonic currents and compensate for fundamental reactive current of a load;
   wherein two modularized active power filters are parallel-connected to a power line for suppressing the harmonic current and compensating the fundamental reactive current of the load.

7. The modularized active power filter as defined in claim 6, wherein a communication line connects to module counting circuits of the control modules of the parallel connected modular active power filters for signal transmission.

8. The modularized active power filter as defined in claim 6, wherein the control signal bus comprises a PWM signal line, a module state signal line, and a current signal line.

* * * * *